US009484156B2

(12) United States Patent
Ning et al.

(10) Patent No.: US 9,484,156 B2
(45) Date of Patent: Nov. 1, 2016

(54) STACK CAPACITOR HAVING HIGH VOLUMETRIC EFFICIENCY

(71) Applicant: Kemet Electronics Corporation, Simpsonville, SC (US)

(72) Inventors: Liancai Ning, Jiangsu (CN); Qun Ya, Jiangsu (CN); Xincheng Jin, Jiangsu (CN); Erik Karlsen Reed, Simpsonville, SC (US); Chris Stolarski, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days.

(21) Appl. No.: 15/170,083

(22) Filed: Jun. 1, 2016

(65) Prior Publication Data

US 2016/0284477 A1 Sep. 29, 2016

Related U.S. Application Data

(60) Division of application No. 14/070,941, filed on Nov. 4, 2013, which is a continuation-in-part of application No. 13/325,659, filed on Dec. 14, 2011, now Pat. No. 8,675,349.

(51) Int. Cl.

| H01G 9/00 | (2006.01) |
|---|---|
| H01G 9/15 | (2006.01) |
| H01G 9/048 | (2006.01) |
| H01G 9/012 | (2006.01) |
| H01G 9/042 | (2006.01) |
| H01G 9/032 | (2006.01) |

(52) U.S. Cl.
CPC .............. *H01G 9/15* (2013.01); *H01G 9/0032* (2013.01); *H01G 9/012* (2013.01); *H01G 9/032* (2013.01); *H01G 9/042* (2013.01); *H01G 9/048* (2013.01); *H01G 9/0425* (2013.01)

(58) Field of Classification Search
None
See application file for complete search history.

(56) References Cited

U.S. PATENT DOCUMENTS

| 6,493,212 B1 | 12/2002 | Clarke et al. |
|---|---|---|
| 6,585,152 B2 | 7/2003 | Farahmandi et al. |
| 6,661,645 B1 | 12/2003 | Sakai et al. |
| 6,833,987 B1 | 12/2004 | O'Phelan |
| 7,085,126 B2 | 8/2006 | Muffoletto et al. |
| 7,180,727 B2 | 2/2007 | Poplett |
| 8,675,349 B2 | 3/2014 | Ning |
| 2004/0066608 A1 | 4/2004 | Takagi et al. |
| 2011/0149476 A1 | 6/2011 | Saida et al. |
| 2013/0155582 A1* | 6/2013 | Ning .................. H01G 9/02 361/529 |
| 2014/0055909 A1* | 2/2014 | Ning .................. H01G 4/30 361/301.4 |

FOREIGN PATENT DOCUMENTS

| JP | 2010-153427 | 7/2010 |
|---|---|---|
| JP | 2012-158466 | 8/2012 |

\* cited by examiner

*Primary Examiner* — Seahvosh Nikmanesh
(74) *Attorney, Agent, or Firm* — Joseph T. Guy; Perkins Law Firm, LLC

(57) ABSTRACT

An improved capacitor and method of making an improved capacitor is set forth. The capacitor has planer anodes with each anode comprising a fusion end and a separated end and the anodes are in parallel arrangement with each anode in direct electrical contact with all adjacent anodes at the fusion end. A dielectric is on the said separated end of each anode wherein the dielectric covers at least an active area of the capacitor. Spacers separate adjacent dielectrics and the interstitial space between the adjacent dielectrics and spacers has a conductive material in therein.

27 Claims, 4 Drawing Sheets

STACK CAPACITOR HAVING HIGH VOLUMETRIC EFFICIENCY

CROSS-REFERENCE TO RELATED APPLICATIONS

The present invention is a divisional application of pending U.S. patent application Ser. No. 14/070,941 filed Nov. 4, 2013 which, in turn, is a Continuation-in-Part application of U.S. patent application Ser. No. 13/325,659 filed Dec. 14, 2011 which is now U.S. Pat. No. 8,675,349 issued Mar. 18, 2014 all of which are incorporated herein by reference.

BACKGROUND

The present invention is related to a solid electrolytic capacitor and a method of making a solid electrolytic capacitor. More specifically, the present invention is related to a solid electrolytic capacitor comprising plate shaped, or planer, anode bodies comprising spacers between adjacent dielectrics.

There has been an ongoing effort to increase functionality in electrical devices while, at the same time, minimizing the overall size. It is well known that in electronic component manufacture decreased size is contradictory to increased functionality. Solid electrolytic capacitors, for example, have been the target of much effort with a focus on increasing the capacitance for a given space, or decreasing the space for a given capacitance, without loss due to parasitic effects such as equivalent series resistance (ESR). With solid electrolytic capacitors formed from stacked layers the art has reached a plateau where further significant increases in capacitance/volume are not considered feasible within the technologies available.

The present invention provides a solid electrolytic capacitor, and a way of making a solid electrolytic capacitor, which provides a significant gain in capacitance/volume and extends the art significantly towards further miniaturization.

SUMMARY

It is an object of the invention to provide a capacitor, and method of making the capacitor, which allows for an increase in volumetric efficiency.

A particular feature of the invention is the ability to manufacture capacitors efficiently and economically using standard manufacturing procedures.

A particular advantage of the invention is the ESR and ESL advantages provided by a low profile capacitors which can be achieved by vertical parallel stacking.

These and other advantages, as will be realized, are provided in a capacitor. The capacitor has planer anodes with each anode comprising a fusion end and a separated end and the anodes are in parallel arrangement with each anode in direct electrical contact with all adjacent anodes at the fusion end. A dielectric is on the separated end of each anode wherein the dielectric covers at least an active area of the capacitor. Spacers separate adjacent dielectrics and the interstitial space between the adjacent dielectrics and spacers has a conductive material therein.

Yet another embodiment is provided in a method of making a capacitor. The method includes:
providing planer anodes wherein each anode has a fusing end and a separated end wherein each anode comprises a dielectric covering at least a portion of the separated end;
applying a matrix to the dielectric of at least a portion of the anodes wherein the matrix comprises a binder and a spacer;
forming a layered stack of anodes wherein at least one matrix is between adjacent dielectrics;
fusing the anodes at the fusing end;
partially removing the binder thereby forming interstitial spaces between adjacent dielectrics with adjacent dielectrics separated by spacers;
inserting a conductive material in the interstitial spaces and over an exterior of the layered stack;
electrically attaching an anode lead to the fused anodes; and
electrically attaching a cathode lead to the conductive material.

Yet another embodiment is provided in an improved capacitor with vertical parallel stacking. The capacitor has planer parallel anodes with each anode comprising a fusion end and a separated end and each anode is in direct electrical contact with all adjacent anodes at the fusion end. A dielectric is on the separated end of each anode and the dielectric covers at least an active area of capacitor. Adjacent dielectrics are separated by at least 1 to no more than 100 µm. Spacers are between adjacent dielectrics and interstitial spaces are between the adjacent dielectrics and around the spacers. A conductive material is in the interstitial spaces.

DESCRIPTION

The present invention is directed to a solid electrolytic capacitor with improved volumetric efficiency. More specifically, the present invention is directed to a method of forming a capacitor comprising the formation of a spacer wherein the spacer is between adjacent dielectrics with interstitial spaces bound by the spacers and adjacent dielectrics. The spacer eliminates the need for conductive carbon and metal layers between adjacent dielectrics and allows the formation of a conductive material layer after stacking the anodes.

The invention will be described with reference to the figures forming an integral, non-limiting, component of the disclosure. The figures are intended to facilitate an understanding of the invention and are not intended to limit the invention in any way. Throughout the figures various elements will be numbered accordingly.

Figure 1:
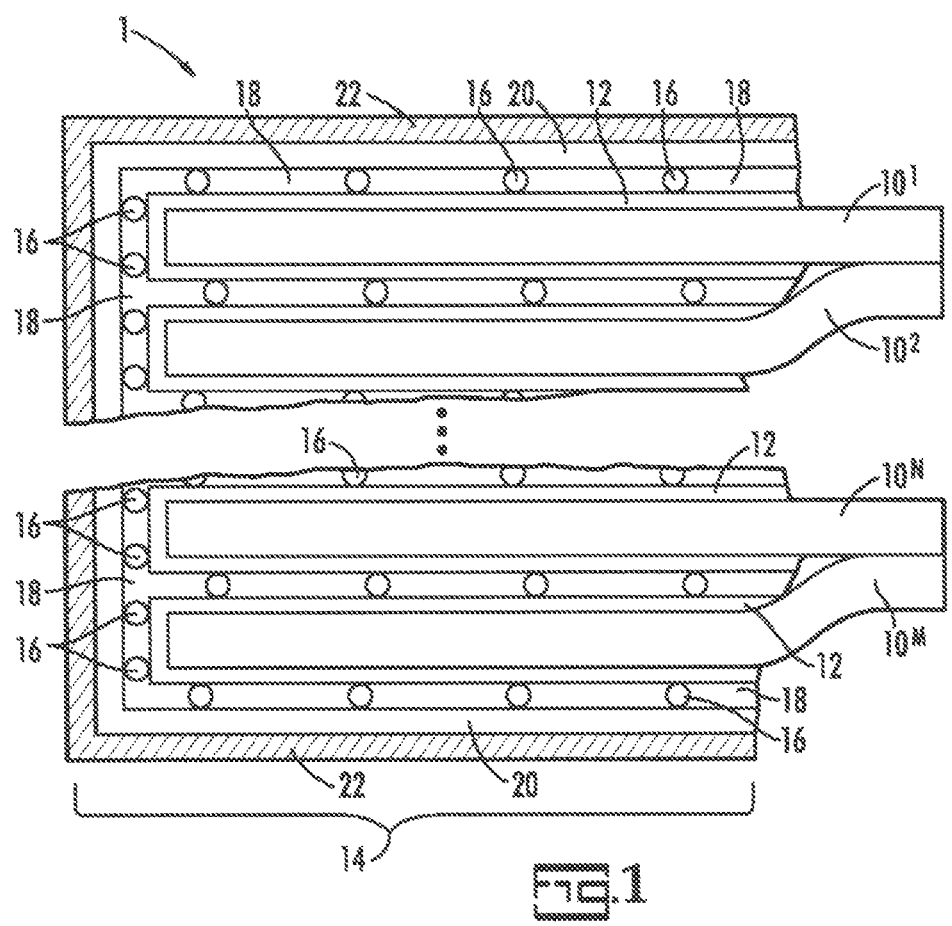
FIG. 1 is a cross-sectional partial schematic view of a capacitor.

An embodiment of the invention will be described with reference to FIG. 1. FIG. 1 is a cross-sectional schematic partial view of a solid electrolytic capacitor. The capacitor, 1, comprises a multiplicity of anodes, $10^1$-$10^m$, in parallel stacked arrangement. Each anode has a fusion end and a separate end. A dielectric, 12, is on the surface of each anode. The dielectric covers, at least, the active portion, 14, of the capacitor and preferably extends beyond the active portion. Spacers, 16, which will be described in more detail herein, provide a separation between adjacent dielectric layers with interstitial spaces between the in-situ formed spacers. The spacers also encase the stack of anodes. The interstitial spaces comprise a conductive material, 18, which is in direct electrical contact with adjacent dielectrics. The conductive material also encases up to the entirety, and preferably the entirety, of the active region, 14. By convention, the conductive material is defined as the cathode layer of the capacitor even though the cathode and anode could be reversed in some applications and with some anode materials. It is well known that adhering external terminations to a conductive material is difficult. Therefore, it is common in the art to apply layers over the conductive material which are conducive to solder attachment to an external termination. At least one layer of conductive carbon, 20, on the conductive material with at least one metal layer, 22, on the conductive carbon layer allows for adhesion to an external termination. A particular feature is the absence of a conductive carbon or metal layer between adjacent dielectrics. By eliminating the need for conductive carbon and metal layers between adjacent dielectrics, and having conductive material in direct physical and electrical contact with the dielectric, a substantial space saving is realized.

The spacers are discrete inert materials dispersed between adjacent dielectrics with a thickness sufficient to separate the dielectrics enough to allow conductive material, or a precursor thereof, to be drawn into the interstitial space by vacuum, by pressure or by wetting. The spacers are preferably adhered to the adjacent dielectrics thereby securing them in fixed relative position during conductive material layer formation. Since the spacers provide no benefit to the function of the completed capacitor it is desirable to have as low a concentration of spacers on the surface as possible thereby allowing for an increasing amount of conductive material.

The spacers facilitate the formation of a conductive material layer between adjacent dielectrics without the inclusion of conductive carbon and metal layers between adjacent dielectrics. The ability to have only one conductor, which is a conductive material, between adjacent dielectrics is a major advantage provided herein. Prior art capacitors typically comprise at least one conductive material layer, at least one conductive carbon layer and at least one metal layer on each dielectric element. When the layers are combined into a stack the number of layers between adjacent dielectrics is doubled. By reducing this to a single layer of conductive material, which may be formed in-situ, significant thickness savings are realized thereby allowing the adjacent dielectrics to be in closer proximity and the entire stack to be much thinner.

To form the in-situ formed spacers a matrix, comprising a binder and spacer, is coated on the surface of the dielectric. The matrix can be applied by dipping, spraying, printing, brushing, rolling or any technique suitable for applying a matrix on a surface of a dielectric. The spacer is preferably a fiber material and more preferably a carbonized fiber material. Dipping is most preferred due to manufacturing convenience. A particularly preferred matrix comprises an easily carbonized binder. A solvent may be used, and is preferably used, to facilitate coating of the matrix.

The solvent for the matrix is not particularly limiting with the proviso that the solvent can be evaporated, does not contaminate the surface of the dielectric and can suspend the other matrix components sufficiently to form a coating. Water, ethanol, iso-propanol, n-butanol, and acetone are mentioned as particularly suitable with water being a preferred solvent for manufacturing compatibility. The amount of solvent is dependent on the matrix and solvent used. A sufficient amount is required to form a matrix which can be coated yet it is desirable for the matrix to not flow freely prior to solvent removal.

The spacer is most preferably an electrically inert material. Fibrous materials are particularly suitable with carbonized paper fiber being exemplary. Various electrolytic papers are used in capacitors with liquid electrolytes and any such carbonized paper can be used for demonstration of the invention. Any fine electrolytic paper, typically referred to in the art as Capacitor Separator, is suitable for demonstration of the invention. Mentioned are nonwood fiber capacitor separators such as the RTZ or MR series commercially available from Nippon Kodoshi Corporation, NKK, of Japan, or the S1 or SM2 series commercially available as Capacitor Paper (KAN) from Zhejiang Kan Specialities Materials Co., Ltd. Of Zhejiang, China as suitable materials for demonstration of the invention. The cross-sectional size of the spacer determines the separation of the dielectrics. The separation is as small as possible preferably with only a sufficient space to allow conductive material and/or a precursor thereof to be introduced into, and to preferably fill, the interstitial spaces. A separation which is larger than necessary is contradictory to the goal of minimization and a separation which is smaller than necessary prohibits formation of an adequate conductive material layer between the adjacent dielectrics. Spacers with an average cross-sectional dimension of at least 1 to 100 microns are preferred with the spacing between adjacent dielectrics being approximately the same as the cross-sectional dimension of the spacers and therefore at least 1 to 100 microns separation between adjacent dielectrics. Below about 1 micron an insufficient amount of conductive material coating is formed with the potential risk of incomplete coverage of dielectric by the conductive material. Above about 100 microns the benefits of size reduction are mitigated with little electrical advantage gained. Fibers with a length at least 1 micron to no more than 150 microns are particularly preferred. If the fibers are shorter than about 1 micron they become less efficient in forming the spacer network and difficult to handle in a manufacturing environment. If the fibers are longer than about 150 microns they start to overlay thereby increasing the separation distance between the dielectric and making the separation more variable. The fiber can comprise polymeric, graphitic or ceramic materials. Preferably, the fiber comprises a polymeric material with multiple hydroxy or carboxylic groups which provide a surface that is easy to wet and will therefore have a high impregnation efficiency. More preferably the fiber comprises about 25% to 85% cellulose and 15% to 75% pentosan prior to carbonization. The carbonized fiber is then preferably ground prior to mixing with the matrix.

A particularly preferred matrix comprises an easily carbonized binder wherein carbonization results in minimal impurities. In a particularly preferred embodiment the binder will adhere the spacer to the dielectric upon carbonization. The matrix materials include fibrin, cellulose, glucose, protein and gelatin. A particularly preferred matrix is a starch. The matrix is typically carbonized by heating such as at a temperature of about 200° C. to 350° C. for a sufficient time. Carbonization enhances the adhesion to the dielectric surface and results in an open pore structure which facilitates electrolyte impregnation during dielectric formation and conductive material formation. This is critical for the dielectric quality and good coverage of the dielectric surface by the conductive material.

For most embodiments the anode stack has at least 2 planer anodes to about 80 planer anodes. There is minimal benefit provided by the instant invention when only one planer anode is used. The invention can be demonstrated with a very large number of planer anodes, but above about 80 the produced capacitor size will not be convenient for surface mount application and may become difficult from a manufacturing perspective. About 8-40 layers are optimum.

Figure 2:
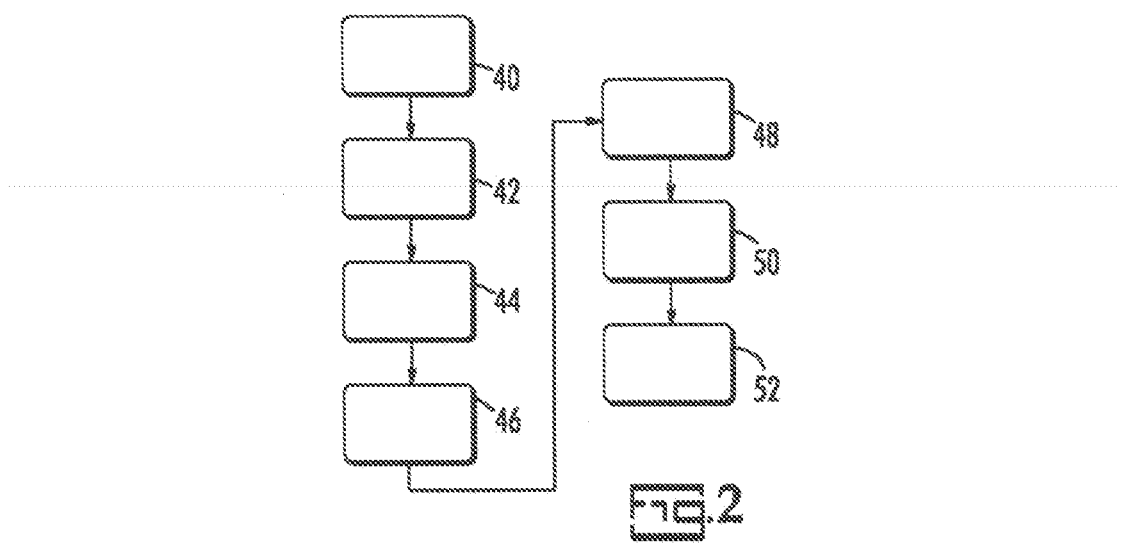
FIG. 2 is a flow chart illustration of a process for forming a capacitor.

A process for forming the capacitor will be described with reference to FIG. 2 wherein a flow chart of the process is provided for the purposes of discussion. The flow chart in FIG. 2 is intended to be supportive of the disclosure and not limiting. Steps may be added to the flow chart or omitted from the flow chart or multiple steps may be combined for brevity.

Figure 3:
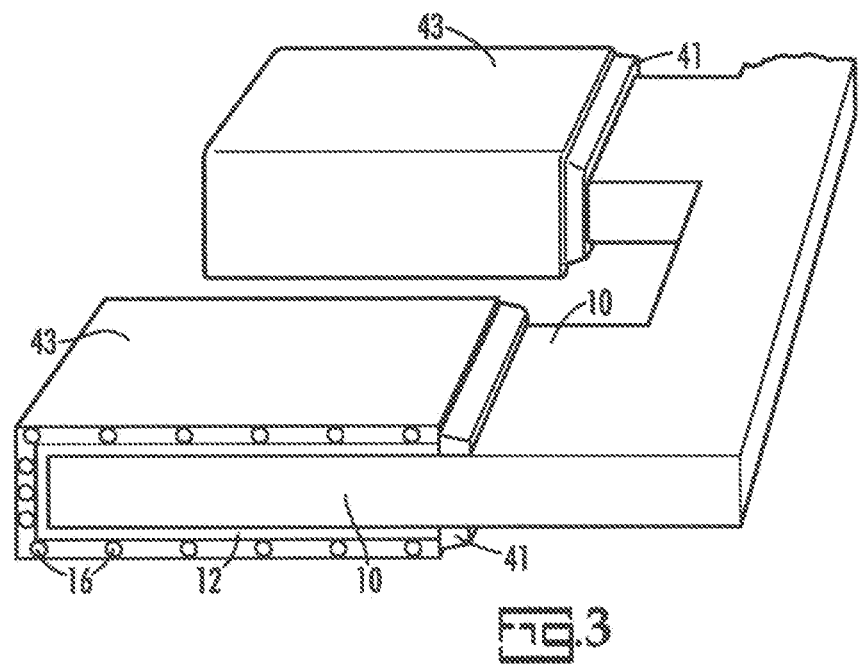
FIG. 3 perspective cross-sectional schematic view of an intermediate product formed during a process for forming a capacitor.

In FIG. 2, an anodized anode is provided at 40. The anodized anode comprises an anode with a dielectric thereon. An optional mask may be provided to prohibit wicking of solution above the mask. A matrix comprising a binder and a spacer is applied to the surface of the dielectric at 42 and the matrix is dried thereby providing a layered structure as illustrated in perspective cross-sectional view in FIG. 3. A particularly preferred spacer is carbonized capacitor separator paper ground to a fiber and a particularly preferred matrix is an easily carbonized material. In FIG. 3, the anode, 10, has a dielectric, 12, thereon. An optional mask, 41, prohibits solution from migrating or wicking beyond the mask when dipping processes are used. A matrix comprising a binder 43, with spacers, 16, therein is on the dielectric, 12. The dielectric may extend beyond the mask and frequently does. The matrix is on at least the faces of alternating dielectrics which will be adjacent to another dielectric.

To prepare the matrix layer a binder, such as starch, is dissolved or dispersed in a solvent. A spacer, such as a carbonized fine electrolytic paper fiber which has been ground to a fiber, is dispersed in the binder with shearing for a sufficient time to insure adequate dispersion. At least 3 hours is typically sufficient. The matrix is coated on the dielectric and dried. The coated dielectrics are stacked to form a layer and the anodes are joined at the fusion end by welding or the like thereby forming a comb-like structure with the dielectrics separated by the matrix. The comb-like structure is heat treated to carbonize the binder with the spacers remaining between the dielectric layers.

Figure 4:
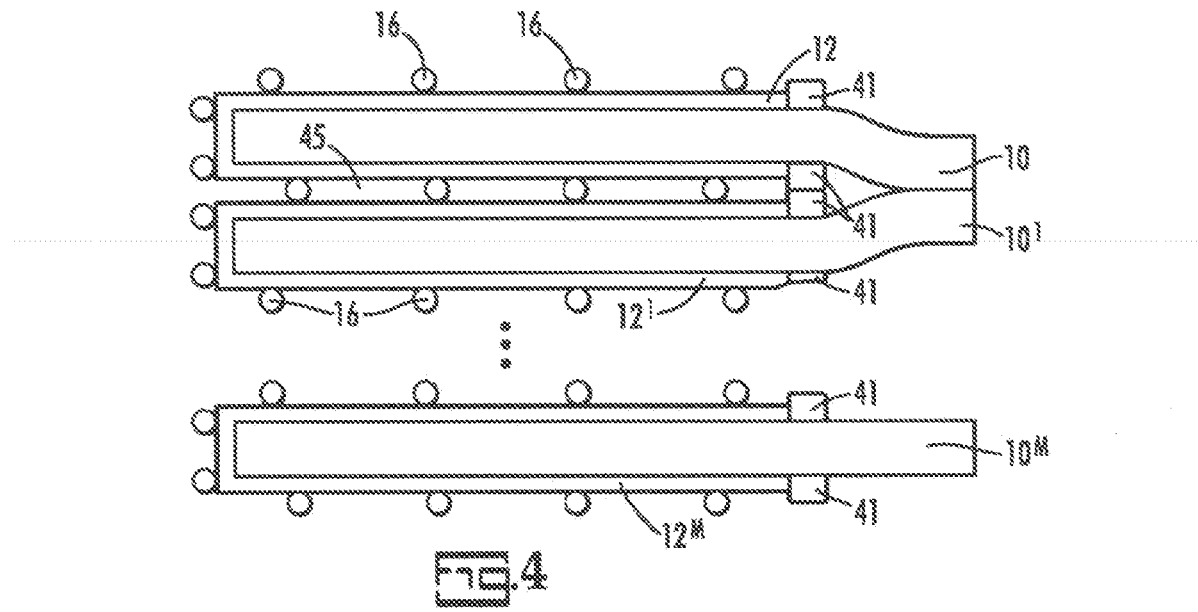
FIG. 4 is cross-sectional schematic view of an intermediate product formed during a process for forming a capacitor.

With continued reference to FIG. 2, a series of anodes, with a dried matrix on at least alternating dielectrics, are layered and the fusion ends of the anode are preferable fused by welding or the like. The matrix is partially removed, such as by carbonization, leaving the spacer and carbonized binder with interstitial space there between at 44 thereby providing a layered structure as illustrated in FIG. 4 in cross-sectional view. It is most preferable that the fusing process eliminates, or removes, any dielectric at the site of fusing. Alternatively, a bond is formed wherein anode material is not separated by dielectric thereby forming a series of anodes all in low resistance electrical contact.

In FIG. 4, the anodes, 10, are fused and the adjacent dielectric layers, 12, are separated by spacers, 16, with interstitial space, 45, between the spacers and dielectric. Preferably the stack has spacers around the entire periphery.

With continued reference to FIG. 2, a conductive material is applied within the interstitial spaces and on the exterior of the stack at 46. The conductive material can be applied as a polymer layer or the polymer can be formed in-situ by applying oxidizers and monomers preferably by sequential dipping. In a particularly preferred embodiment the stack is dipped in an oxidizer whereby oxidizer is deposited on the surface of the dielectric followed by dipping in a monomer solution wherein monomer migrates into the interstitial spaces to be polymerized by the oxidizer. The monomer may be applied first with oxidizer added thereafter. Repeating the alternate application of monomer and oxidizer is preferred to insure that as much of the interstitial space is filled as possible. Application of polymer, either prior to the application of monomer or after formation of polymer from monomer, is contemplated. It is preferable to undergo a reform step after polymer formation as known in the art.

The monomer or polymer is dispersed into the interstitial spaces by wetting or by pressure changes. In one embodiment, the stacked element with interstitial spaces defined by spacers and dielectric is subjected to a reduced pressure prior to introduction to the polymer or monomer. In another embodiment the stacked element is introduced to the polymer or monomer and the polymer or monomer solution is subjected to increased pressure thereby encouraging the polymer or monomer into the interstitial spaces.

With continued reference to FIG. 2, a conductive carbon layer is formed on the exterior of the conductive material at 48. The conductive material provides a transition surface which adheres to the conductive material and provides a surface which a subsequent metal layer can adhere to. A metal layer is applied on the conductive carbon layer at 50 thereby providing a layered structure as illustrated in FIG. 1.

The capacitor is finished and tested at 52 of FIG. 2. Finishing may include attachment of external terminations, encapsulation, insertion into a case and the like.

Figure 5:
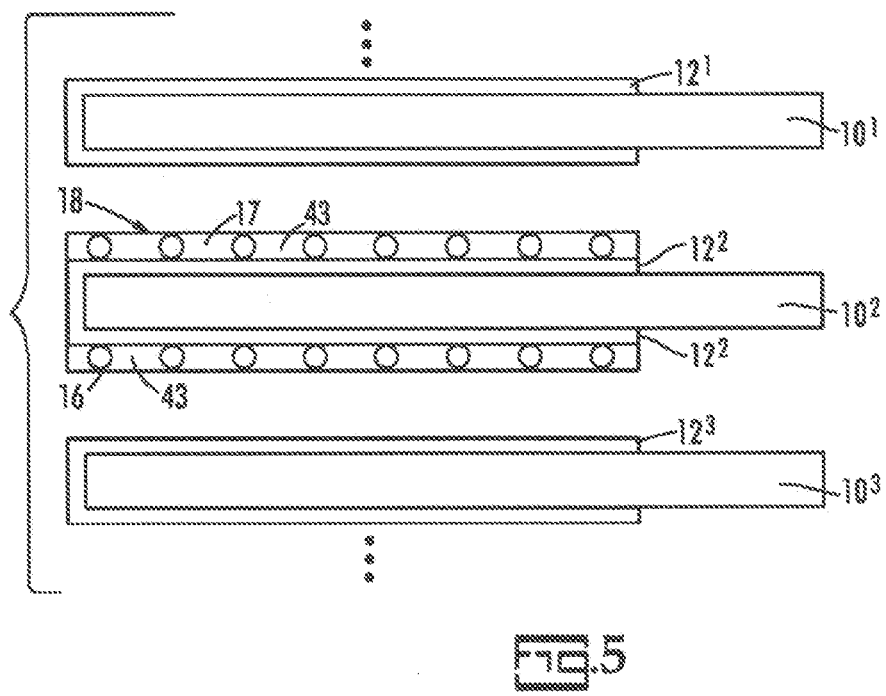
FIG. 5 is cross-sectional schematic view of an intermediate product formed during a process for forming a capacitor.

An embodiment of the invention will be described with reference to FIG. 5 wherein a partially exploded cross-sectional view is schematically illustrated. In FIG. 5, a series of anodes, 10, are provided with each having a dielectric, 12, thereon. A matrix, 18, with a binder, 43, and a spacer, 16, therein is formed on dielectrics, $12^2$ of alternate anodes. Adjacent dielectrics, $12^1$ and $12^3$, do not have the matrix thereon. When the three layers are brought together in a stack adjacent dielectrics have a matrix there between comprising spacers in a binder. This minimizes processing steps since only alternate dielectrics need to be coated with the matrix. The coating can be formed by dipping which will necessarily include a matrix on the end and minor faces which is not detrimental. Alternatively, the matrix can be applied by spraying or coating thereby insuring the matrix is applied primarily to the major faces.

Figure 6:
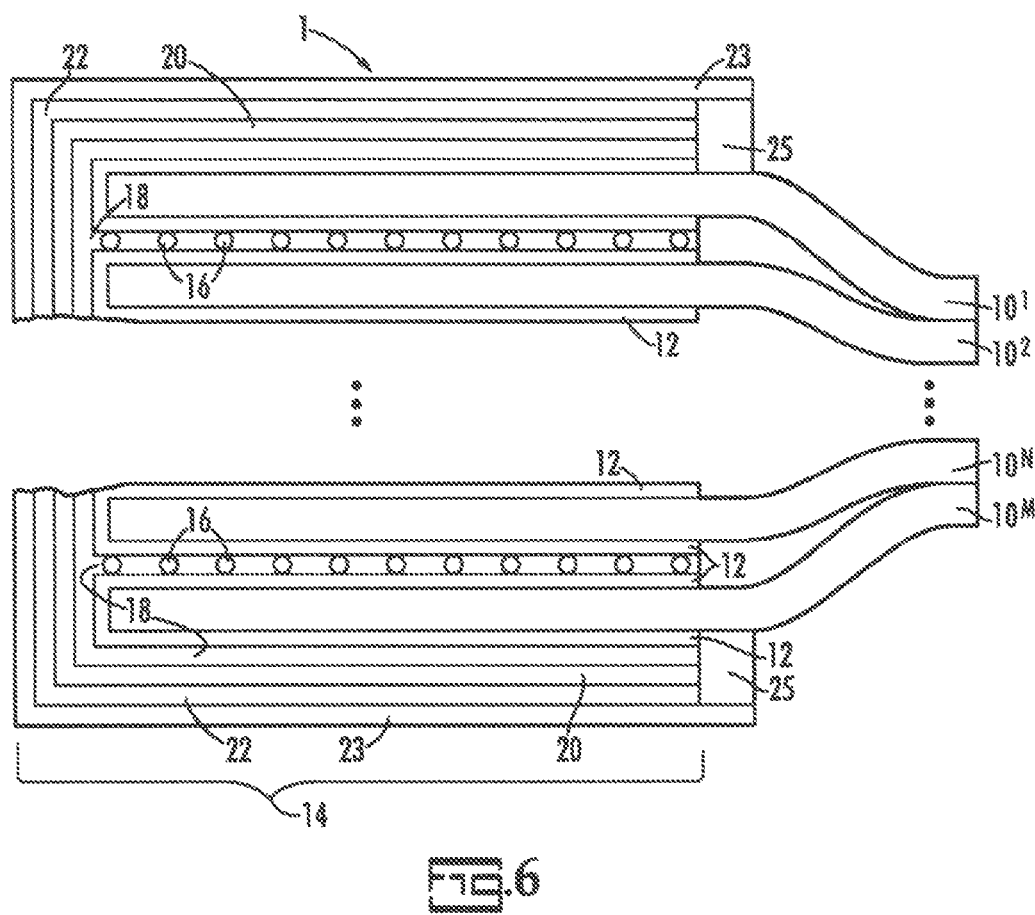
FIG. 6 is a cross-sectional partial schematic view of a capacitor.

FIG. 6 is a cross-sectional schematic partial view of a solid electrolytic capacitor. The capacitor, 1, comprises a multiplicity of anodes, $10^1$-$10^m$, in parallel arrangement. A dielectric, 12, is on the surface of each anode. The dielectric covers, at least, the active portion, 14, of the capacitor and preferably extends beyond the active portion. Spacers, 16, provide a separation between adjacent dielectric layers, a conductive material, 18, fills the separation. The conductive material also encases up to the entirety, and preferably the entirety, of the active region, 14. At least one layer of conductive carbon, 20, on the conductive material with at least one metal layer, 22, on the conductive carbon layer allows for adhesion to an external termination. A particular feature is the absence of a conductive carbon or metal layer between adjacent dielectrics. By eliminating the conductive carbon and metal layers between adjacent dielectrics a substantial space savings is realized.

The anodes are formed from a conductor, preferably a metal, and most preferably a valve metal or a conductive oxide of a valve metal. Particularly preferred anodes comprise Al, Ta, Nb, Ti, Zr, NbO or alloys thereof. Aluminum is a particularly preferred anode material for demonstration of the invention.

The dielectric is preferably an oxide of the anode due to the manufacturing conveniences provided thereby and the widespread knowhow in the art of capacitor manufacture related to the formation of oxides of the anode. The thickness of the dielectric is controlled by the formation voltage as is well known in the art. The dielectric is typically formed by subjecting the anode to a charge in the presence of an anodizing solution. Anodizing solutions are not particularly limited herein and virtually any dielectric formation technique or anodizing solution is suitable for demonstration of the teachings herein. Anodizing as detailed in, for example, U.S. Pat. Nos. 7,780,835; 7,678,259; 7,342,773; 7,248,462 and 7,125,610 represents exemplary teachings of anodizing solutions and techniques.

The cathode layer is a conductive layer preferably comprising conductive polymer, such as polythiophene, polyaniline, polypyrrole or their derivatives, manganese dioxide, lead oxide; a charge transfer material or combinations thereof. An intrinsically conducting polymer is most preferred.

A particularly preferred conducting polymer is illustrated in Formula I:

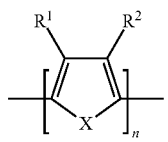

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred. In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates. A particularly preferred polymer is 3,4-polyethylene dioxythiophene (PEDT).

If a manganese dioxide layer is used the manganese dioxide layer is preferably obtained by immersing the stacked anodes in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

It is preferred to include a dopant in the polymer. The dopant can be coated separately or included in the monomer solution. A particularly preferred dopant is the sodium salt of polystyrenesulfonate (PSS).

To enhance subsequent connectivity to external termination, such as a lead frame, adhesion layers may be applied to the conductive polymer layer. The adhesion layers typically include a carbon containing layer and a metal containing layer such as a silver or nickel containing layer. The outermost layer is preferably a layer which is solderable such as a nickel layer or a silver layer deposited such as by vapor deposition.

EXPERIMENTAL

Example 1

An oxide was formed on aluminum foil to a rated withstanding voltage of 11 volts to produce a foil with a capacitance gain of 190 μF/cm². The foil was slit to a 3.5 mm width, cut to length and welded onto a process bar. A masking line was applied to the element to define an area of 4.7 mm×3.5 mm for edge formation.

Electrolytic paper RTZ30-40 was carbonized at 300° C. and ground to form a fiberous spacer. A matrix precursor was formed by mixing capacitor grade super starch, the spacer and deionized water in a 1:1:20 wt. ratio. The binder was first dissolved or dispersed in the solvent followed by dispersion of the spacer by shearing for at least 3 hours. The dielectric was dipped twice in the matrix and dried. Eight (8) elements were stacked together to form an anode. The positive ends of the anodes were fused by resistance welding. The matrix was carbonized by heating at 300° C. for 30 minutes.

The edge of the anode elements in the stack is formed in an electrolyte solution to 11 volts. The edge formation process is well known in the art as illustrated by U.S. Pat. No. 6,562,652 and U.S. Pat. No. 6,744,621.

The anode was sequentially immersed under vacuum condition in an aqueous oxidant solution prepared to contain 25 wt % of ammonium persulfate and 1 wt % of sodium tosylate, and then in a propanol solution of 1.5 mol/L of 3,4-ethylenedioxy-thiophene. The anode was maintained at 40.5° C. for 30 minutes to finish polymerization. The process from immersion in the aqueous oxidant solution to this polymerization reaction was repeated 3 times. The anode was then rinsed of polymerization byproducts and carbon and silver paste layers were applied.

The anode was attached to a lead frame, and then encapsulated into a case of 7.30 mm×4.30 mm×1.90 mm using an epoxy compound. The capacitance was then measured with HP 4263B LCR meter.

The capacitance recovery was defined by:

Capacitance recovery=Measured capacitance value per element/theoretical calculated capacitance value per element Theoretical calculated capacitance value per element=0.47 cm×0.35 cm×190 µF/cm$^2$=31.26 µF Capacitance recovery is shown in Table 1.

Example 2

A stack capacitor was manufactured and evaluated in the same way as in Example 1, except for the pressure environment for immersion. For the application of pressure environment, the anode was sequentially immersed under normal atmosphere in an aqueous oxidant solution. Capacitance recovery is shown in Table 1.

Comparative Example 1

A stack capacitor was manufactured and evaluated in the same way as in Example 2, except that the spacers were not utilized. The matrix precursor was formed by mixing starch with deionized water in a 1:20 wt. ratio. Capacitance recovery is shown in Table 1.

Comparative Example 2

A stack capacitor was manufactured and evaluated in the same way as in Comparative example 1, except for pressure environment for immersion. For the application of pressure environment, the anode was sequentially immersed under vacuum condition in an aqueous oxidant solution. Capacitance recovery is shown in Table 1.

TABLE 1

|  | Spacers | Immersion under Vacuum | Capacitance recovery |
| --- | --- | --- | --- |
| Example 1 | Yes | Yes | 92% |
| Example 2 | Yes | No | 75% |
| Comparative example 1 | No | No | 0% |
| Comparative example 2 | No | Yes | 85% |

As illustrated by the embodiment examples, the utilization of spacers between dielectrics together with a matrix that can be carbonized to provide an interstitial pore structure results in the most favorable capacitance recovery. It is most preferable to form the polymer layer under vacuum.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A method of making a capacitor comprising:
providing planer anodes wherein each anode of said anodes comprises a fusing end and a separated end wherein each said anode comprises a dielectric covering at least a portion of said separated end;
applying a matrix to said dielectric of at least a portion of said anodes wherein said matrix comprises a binder and a spacer;
forming a layered stack of said anodes wherein at least one matrix is between adjacent dielectrics;
fusing said anodes at said fusing end;
partially removing said binder thereby forming interstitial spaces between said adjacent dielectrics with said adjacent dielectrics separated by said spacers;
inserting a conductive material in said interstitial spaces and over an exterior of said layered stack;
electrically attaching an anode lead to said fused anodes; and
electrically attaching a cathode lead to said conductive material.

2. The method of forming a capacitor of claim 1 further comprising:
forming a conductive carbon layer on said conductive coating over said exterior of said layered stack prior to said electrically attaching said cathode lead.

3. The method of forming a capacitor of claim 2 further comprising:
forming a metal layer on said conductive carbon layer prior to said electrically attaching said cathode lead.

4. The method of forming a capacitor of claim 1 wherein said removing of said binder includes heating said binder.

5. The method of forming a capacitor of claim 1 wherein said anode comprises a material selected from the group consisting of Ta, Nb, Al, NbO, Ti, Zr and alloys thereof.

6. The method of forming a capacitor of claim 1 wherein said conductive material is selected from intrinsically conductive polymers, charge transfer conducting compounds or conductive oxides.

7. The method of forming a capacitor of claim 6 wherein said conductive material comprises a polythiophene.

8. The method of forming a capacitor of claim 7 wherein said conductive material comprises poly 3,4-ethylene dioxythiophene.

9. The method of forming a capacitor of claim 6 wherein said conductive material comprises manganese dioxide.

10. The method of forming a capacitor of claim 6 wherein said inserting said conductive polymer comprises introduction of an oxidizer and a monomer into said interstitial spaces.

11. The method of forming a capacitor of claim 10 wherein said monomer is introduced into said interstitial space prior to introduction of said oxidizer.

12. The method of forming a capacitor of claim 6 wherein said inserting said conductive polymer comprises introduction of a slurry comprising said polymer to said interstitial space.

13. The method of forming a capacitor of claim 1 wherein said spacer comprises carbonized fibers.

14. The method of forming a capacitor of claim 13 wherein said fibrous materials have an average cross-sectional size at least 1 to no more than 100 µm along the diameter direction.

15. The method of forming a capacitor of claim 13 wherein said carbonized fibers have a length of at least 1 to no more than 150 µm.

16. The method of forming a capacitor of claim 1 wherein adjacent dielectrics are separated by at least 1 to no more than 100 μm.

17. The method of forming a capacitor of claim 1 further comprising carbonizing a polymer to form said spacer.

18. The method of forming a capacitor of claim 17 wherein said polymer comprises hydroxy or carboxylic groups.

19. The method of forming a capacitor of claim 17 wherein said polymer comprises at least one material selected from cellulose and pentosan.

20. The method of forming a capacitor of claim 19 wherein said polymer comprises 25-85 wt % cellulose.

21. The method of forming a capacitor of claim 19 wherein said polymer comprises 15-75 wt % pentosan.

22. The method of forming a capacitor of claim 1 wherein said binder comprises a material selected from the group consisting of fibrin, cellulose, glucose, protein and gelatin.

23. The method of forming a capacitor of claim 22 wherein said binder is starch.

24. The method of forming a capacitor of claim 1 wherein said inserting said conductive material comprises applying vacuum to said layered stack.

25. The method of forming a capacitor of claim 1 wherein said fusing said anodes comprises welding.

26. The method of forming a capacitor of claim 1 comprising at least 2 planer anodes to no more than 80 planer anodes.

27. The method of forming a capacitor of claim 1 wherein said forming said stacked layer comprises alternating anodes comprising said matrix coating with anodes not comprising said matrix coating.

* * * * *